United States Patent
Yasuda et al.

(10) Patent No.: US 11,401,568 B2
(45) Date of Patent: *Aug. 2, 2022

(54) STEEL MATERIAL FOR LINE PIPES, METHOD FOR PRODUCING THE SAME, AND METHOD FOR PRODUCING LINE PIPE

(71) Applicant: JFE Steel Corporation, Tokyo (JP)

(72) Inventors: Kyono Yasuda, Tokyo (JP); Tomoyuki Yokota, Tokyo (JP); Akihiko Tanizawa, Tokyo (JP); Ryuji Muraoka, Tokyo (JP); Kazukuni Hase, Tokyo (JP)

(73) Assignee: JFE Steel Corporation

( * ) Notice: Subject to any disclaimer, the term of this patent is extended or adjusted under 35 U.S.C. 154(b) by 0 days.

This patent is subject to a terminal disclaimer.

(21) Appl. No.: 16/964,661

(22) PCT Filed: Jan. 22, 2019

(86) PCT No.: PCT/JP2019/001853
§ 371 (c)(1),
(2) Date: Jul. 24, 2020

(87) PCT Pub. No.: WO2019/151045
PCT Pub. Date: Aug. 8, 2019

(65) Prior Publication Data
US 2021/0054471 A1 Feb. 25, 2021

(30) Foreign Application Priority Data

Jan. 30, 2018 (JP) .............................. JP2018-013319

(51) Int. Cl.
| | |
|---|---|
| B32B 15/00 | (2006.01) |
| C21D 8/02 | (2006.01) |
| B21C 37/08 | (2006.01) |
| C22C 38/02 | (2006.01) |
| C22C 38/04 | (2006.01) |
| C22C 38/06 | (2006.01) |
| C22C 38/42 | (2006.01) |
| C22C 38/44 | (2006.01) |
| C22C 38/46 | (2006.01) |
| C22C 38/48 | (2006.01) |
| C22C 38/50 | (2006.01) |

(52) U.S. Cl.
CPC ............ *C21D 8/0226* (2013.01); *B21C 37/08* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C21D 2211/001* (2013.01); *C21D 2211/002* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | | |
|---|---|---|---|
| 6,264,760 B1 | 7/2001 | Tamehiro et al. | |
| 2007/0125462 A1 | 6/2007 | Asahi et al. | |
| 2012/0285576 A1* | 11/2012 | Nishimura | ............... C22C 38/06 |
| | | | 138/177 |
| 2012/0305122 A1 | 12/2012 | Ishikawa et al. | |
| 2021/0054471 A1 | 2/2021 | Yasuda et al. | |

FOREIGN PATENT DOCUMENTS

| | | |
|---|---|---|
| CN | 101163807 A | 4/2008 |
| CN | 101548026 A | 9/2009 |
| CN | 102549189 A | 7/2012 |
| CN | 102639734 A | 8/2012 |
| CN | 102666898 A | 9/2012 |
| EP | 1860204 A1 | 11/2007 |
| EP | 2105513 A1 | 9/2009 |
| EP | 2484792 A1 | 8/2012 |
| EP | 2505682 A1 | 10/2012 |

(Continued)

OTHER PUBLICATIONS

International Search Report and Written Opinion for International Application No. PCT/JP2019/001853, dated Apr. 23, 2019, 4 pages.
Non Final Office Action for U.S. Appl. No. 16/965,719, dated Sep. 22, 2021, 13 pages.
Russian Office Action for Russian Application No. 2020125382, dated Jan. 18, 2021, with translation, 16 pages.
Chinese Office Action with Search Report for Chinese Application No. 201980010673.6, dated Jul. 29, 2021, 12 pages.
Extended European Search Report for European Application No. 19 747 875.3, dated Feb. 17, 2021, 5 pages.
Chinese Office Action for Chinese Application No. 201980010673. 6, dated Dec. 23, 2021, with Concise Statement of Relevance of Office Action, 9 pages.

(Continued)

*Primary Examiner* — Seth Dumbris

(74) *Attorney, Agent, or Firm* — RatnerPrestia

(57) ABSTRACT

A method for producing a steel material for line pipes which has a tensile strength of 570 MPa or more, a compressive strength of 440 MPa or more, and a thickness of 30 mm or more, the method including heating a steel having a specific composition to a temperature of 1000° C. to 1200° C.; performing hot rolling such that a cumulative rolling reduction ratio in a non-recrystallization temperature range is 60% or more, a cumulative rolling reduction ratio in a temperature range of (a rolling finish temperature +20° C.) or less is 50% or more, and a rolling finish temperature is the $Ar_3$ transformation point or more and 790° C. or less; and subsequently performing accelerated cooling from a cooling start temperature of the $Ar_3$ transformation point or more, at a cooling rate of 10° C./s or more, until the temperature of a surface of a steel plate reaches 300° C. to 500° C.

4 Claims, No Drawings

(56) References Cited

FOREIGN PATENT DOCUMENTS

| | | |
|---|---|---|
| EP | 2505683 A1 | 10/2012 |
| EP | 2862954 A1 | 4/2015 |
| EP | 3040439 A1 | 7/2016 |
| EP | 3276020 A1 | 1/2018 |
| EP | 3279352 A1 | 2/2018 |
| EP | 3385399 A1 | 10/2018 |
| JP | 0949025 A | 2/1997 |
| JP | 2001064724 A | 3/2001 |
| JP | 2001511482 A | 8/2001 |
| JP | 2002102931 A | 4/2002 |
| JP | 2003340519 A | 12/2003 |
| JP | 2003342639 A | 12/2003 |
| JP | 2004035925 A | 2/2004 |
| JP | 2008056962 A | 3/2008 |
| JP | 2009052137 A | 3/2009 |
| JP | 2009091653 A | 4/2009 |
| JP | 2011132601 A | 7/2011 |
| JP | 2012241266 A | 12/2012 |
| JP | 2012241267 A | 12/2012 |
| RU | 2151214 C1 | 6/2000 |
| RU | 2331698 C2 | 8/2003 |
| RU | 2620837 C2 | 5/2017 |
| WO | 9617966 A1 | 6/1996 |
| WO | 2016157235 A1 | 10/2016 |
| WO | 2016157863 A1 | 10/2016 |
| WO | 2017094593 A1 | 6/2017 |

OTHER PUBLICATIONS

Non Final Office Action for U.S. Appl. No. 13/511,822, dated Jun. 19, 2013, 11 pages.
Final Office Action for U.S. Appl. No. 13/511,822, dated Feb. 5, 2014, 16 pages.
Non Final Office Action for U.S. Appl. No. 13/511,822, dated Oct. 3, 2014, 14 pages.
Final Office Action for U.S. Appl. No. 13/511,822, dated May 18, 2015, 12 pages.
Korean Office Action for Korean Application No. 10-2020-7021593, dated Jan. 3, 2022, with Concise Statement of Relevance of Office Action, 8 pages.

\* cited by examiner

STEEL MATERIAL FOR LINE PIPES, METHOD FOR PRODUCING THE SAME, AND METHOD FOR PRODUCING LINE PIPE

CROSS REFERENCE TO RELATED APPLICATIONS

This is the U.S. National Phase application of PCT/JP2019/001853, filed Jan. 22, 2019, which claims priority to Japanese Patent Application No. 2018-013319, filed Jan. 30, 2018, the disclosures of these applications being incorporated herein by reference in their entireties for all purposes.

FIELD OF THE INVENTION

The present invention relates to a steel material for line pipes, a method for producing the steel material for line pipes, and a method for producing a line pipe. The present invention relates to a steel material for line pipes which is suitable as a material for line pipes used for the transportation of oil and natural gas and is particularly suitable as a material for offshore pipelines, which are required to have a high collapse resistant performance, a method for producing such a steel material for line pipes, and a method for producing a line pipe. The term "compressive strength" used herein refers to 0.5% compressive proof strength and is also referred to as "compressive yield strength", unless otherwise specified.

BACKGROUND OF THE INVENTION

With an increasing demand for energy, the development of oil and natural gas pipelines has been active. Various pipelines that extend across sea have been developed in order to cope with a situation where gas fields or oil fields are located at remoter places or versatility in transport routes. Line pipes used as offshore pipelines have a larger wall thickness than onshore pipelines in order to prevent collapse due to water pressure. Furthermore, the line pipes used as offshore pipelines are required to have a high degree of roundness. In addition, as for the properties of line pipes, the line pipes need to have a high compressive strength in order to resist the compression stress caused in the circumferential direction of the pipes by an external pressure.

Since the final step of a method for making UOE steel pipes includes a pipe expanding process, the pipes are compressed after the pipes have been subjected to a tensile deformation in the circumferential direction of the pipes. Consequently, compressive yield strength may be reduced due to the Bauschinger effect.

There have been various studies of improvement of the collapse resistant performance of UOE steel pipes. Patent Literature 1 discloses a method in which a steel pipe is heated by Joule heating and expanded, and the temperature is subsequently held for a certain period of time or more.

As a method in which heating is performed subsequent to the pipe expansion in order to restore the reduction in compressive yield strength caused by the Bauschinger effect as described above, Patent Literature 2 proposes a method in which the outer surface of a steel pipe is heated to a temperature higher than that of the inner surface in order to restore the impact due to the Bauschinger effect caused in the outer surface-side portion of the steel pipe which has been subjected to a tensile deformation and to maintain the strain hardening of the inner surface-side portion due to compression. Patent Literature 3 proposes a method in which, in a steel plate making process using a steel containing Nb and Ti, accelerated cooling is performed from a temperature of the $Ar_3$ transformation point or more to the temperature of 300° C. or less subsequent to hot rolling and heating is performed after a steel pipe has been formed by the UOE process.

On the other hand, as a method in which the compressive strength of a steel pipe is increased by adjusting the conditions under which the steel pipe is formed, instead of performing heating subsequent to the pipe expansion, Patent Literature 4 discloses a method in which the compression ratio at which compression is performed when a steel pipe is formed using the O-ing press is set to be higher than the expansion ratio at which pipe expansion is performed in the subsequent step.

Patent Literature 5 discloses a method in which the diameter of a steel pipe which passes through the vicinity of a weld zone, which has a low compressive strength, and the position that forms an angle of 180° with respect to the weld zone is set to be the maximum diameter of the steel pipe in order to enhance the collapse resistant performance of the steel pipe.

Patent Literature 6 proposes a steel plate capable of limiting a reduction in yield stress due to the Bauschinger effect, which is produced by performing reheating subsequent to accelerated cooling to reduce the fraction of the hard second phase in the surface-layer portion of the steel plate.

Patent Literature 7 proposes a method for producing a high-strength steel plate for line pipes for sour gas service having a thickness of 30 mm or more, in which the surface-layer portion of a steel plate is heated in a reheating process performed subsequent to accelerated cooling while a rise in the temperature of the center of the steel plate is suppressed.

PATENT LITERATURE

PTL 1: Japanese Unexamined Patent Application Publication No. 9-49025
PTL 2: Japanese Unexamined Patent Application Publication No. 2003-342639
PTL 3: Japanese Unexamined Patent Application Publication No. 2004-35925
PTL 4: Japanese Unexamined Patent Application Publication No. 2002-102931
PTL 5: Japanese Unexamined Patent Application Publication No. 2003-340519
PTL 6: Japanese Unexamined Patent Application Publication No. 2008-56962
PTL 7: Japanese Unexamined Patent Application Publication No. 2009-52137

SUMMARY OF THE INVENTION

According to the method described in Patent Literature 1, dislocation brought about by the pipe expansion is eliminated or dispersed and, consequently, compressive strength is increased. However, this method requires the Joule heating to be continued for five minutes or more subsequent to the pipe expansion and is therefore poor in terms of productivity.

In the method described in Patent Literature 2, it is necessary to individually manage the temperatures at which the outer and inner surfaces of a steel pipe are heated and the amounts of time during which the outer and inner surfaces of the steel pipe are heated. This is difficult in terms of the actual production. It is considerably difficult to manage the quality of steel pipes in a mass production process. The method described in Patent Literature 3 requires the accelerated cooling stop temperature in the production of a steel plate to be a low temperature of 300° C. or less. This may increase the distortion of a steel plate and degrades the roundness of a steel pipe produced by the UOE process. Furthermore, since the accelerated cooling is performed from a temperature of the $Ar_3$ point or more, it is necessary to perform rolling at a relatively high temperature. This may result in the degradation of toughness.

According to the method described in Patent Literature 4, tensile pre-strain substantially does not occur in the circumferential direction of the pipe. Accordingly, the Bauschinger effect is not produced and a high compressive strength may be achieved. However, a low expansion ratio makes it difficult to maintain the roundness of a steel pipe and may degrade the collapse resistant performance of the steel pipe.

The portion of a pipeline which is prone to collapse when the pipeline is actually constructed is a portion (sag-bend portion) subjected to a bending deformation when the pipe reaches the seabed. When a pipeline is constructed, girth welding is performed on the pipe and the pipes are laid on the seabed without reference to the positions of weld zones of steel pipes. Therefore, even if steel pipes are produced by performing pipe forming and welding such that a cross section of each of the steel pipes has the maximum diameter at the seam weld zone as described in Patent Literature 5, it is not possible to determine the positions of the seam weld zones when a pipeline is constructed actually. Thus, the technology according to Patent Literature 5 does not produce virtually any advantageous effects.

The steel plate described in Patent Literature 6 needs to be heated in the reheating until the center of the steel plate is heated. This may result in the degradation of a DWTT (drop weight tear test) property. Therefore, it is difficult to use this steel plate for producing deep-sea thick-walled line pipes. In addition, the steel plate has room for improvement in terms of increase in the thickness of the steel plate.

According to the method described in Patent Literature 7, the fraction of the hard second phase in the surface-layer portion of a steel plate may be reduced while the degradation of a DWTT (drop weight tear test) property is limited. This may reduce the hardness of a surface-layer portion and inconsistencies in the material property of the steel plate. Furthermore, the reduction in the fraction of the hard second phase may reduce the Bauschinger effect. However, it is difficult to consistently achieve a strength of X70 grade or more while maintaining a DWTT property by the technology described in Patent Literature 7.

Aspects of the present invention were made in view of the above-described circumstances. An object according to aspects of the present invention is to provide a steel material for line pipes having a heavy wall thickness of 30 mm or more, a high strength required for applying the steel material to offshore pipelines, excellent low-temperature toughness, and an excellent DWTT property, a method for producing the steel material for line pipes, and a method for producing a line pipe.

The inventors of the present invention conducted extensive studies in order to limit the reduction in compressive strength due to the Bauschinger effect and maintain strength and toughness and, as a result, found the following facts.

(a) The reduction in compressive strength due to the Bauschinger effect is induced by the back stress caused as a result of the dislocation accumulation at the interfaces between different phases and the hard second phase. For preventing this, first, it is effective to form a uniform microstructure in order to reduce the interfaces between the soft and hard phases, at which dislocations are integrated. Accordingly, forming a metal microstructure composed primarily of bainite in which the formation of soft polygonal ferrite and a hard martensite-austenite constituent is suppressed may limit the reduction in compressive strength due to the Bauschinger effect.

(b) It is difficult to completely inhibit the formation of the martensite-austenite constituent (hereinafter, may be referred to simply as "MA") in high-strength steel produced by accelerated cooling and, in particular, thick-walled steel plates used for producing offshore pipelines because such high-strength steel and thick-walled steel plates have high hardenability as a result of containing large amounts of alloying elements to achieve an intended strength. However, the reduction in compressive strength due to the Bauschinger effect may be limited when MA is decomposed into cementite by optimizing accelerated cooling.

(c) For enhancing low-temperature toughness, it is effective to reduce the size of microstructures by lowering the rolling temperature at which a steel plate is hot-rolled. However, if the rolling temperature is excessively low, polygonal ferrite may be formed and a mixed microstructure of bainite and polygonal ferrite may be formed subsequent to the accelerated cooling. This increases the Bauschinger effect. On the other hand, adjusting the composition of the steel contributes to reduction in formation of polygonal ferrite being formed subsequent to rolling with a low rolling temperature. This enables both suitable low-temperature toughness and suitable compressive strength to be achieved. In addition, controlling the rolling reduction during hot rolling enables introduction of a number of deformation bands, which serve as nuclei for transformation, and refinement of microstructures. This enables even a thick-walled steel plate having a thickness of 30 mm or more to have high low-temperature toughness.

Aspects of the present invention were made on the basis of the above findings and additional studies. The summary of aspects of the present invention is as follows.

[1] A method for producing a steel material for line pipes, the steel material having a tensile strength of 570 MPa or more, a compressive strength of 440 MPa or more, and a thickness of 30 mm or more, the method including heating a steel having a composition containing, by mass, C: 0.030% to 0.10%,
Si: 0.01% to 0.20%,
Mn: 1.0% to 2.0%,
Nb: 0.005% to 0.050%,
Ti: 0.005% to 0.025%, and
Al: 0.08% or less, the composition further containing one or more elements selected from, by mass, Cu: 0.5% or less,
Ni: 1.0% or less,
Cr: 1.0% or less,
Mo: 0.5% or less, and
V: 0.1% or less, wherein a Ceq value represented by Formula (1) is 0.350 or more, a Pcm value represented by Formula (2) is 0.20 or less, and an $Ar_3$ transformation point represented by Formula (3) is 750° C. or less, with the balance being Fe and inevitable impurities, to a temperature of 1000° C. to 1200° C.; performing hot rolling such that a cumulative rolling reduction ratio in a non-recrystallization temperature range is 60% or more, such that a cumulative rolling reduction ratio in a temperature range of (a rolling finish temperature +20° C.) or less is 50% or more, and such that a rolling finish temperature is the $Ar_3$ transformation point or more and 790° C. or less; and subsequently performing accelerated cooling from a cooling start temperature of the $Ar_3$ transformation point or more, at a cooling rate of 10° C./s or more, until the temperature of a surface of a steel plate reaches 300° C. to 500° C., $$Ceq=C+Mn/6+(Cu+Ni)/15+(Cr+Mo+V)/5 \quad (1)$$

$$Pcm=C+Si/30+(Mn+Cu+Cr)/20+Ni/60+Mo/15+V/10 \quad (2)$$

$$Ar_3(°\ C.)=910-310C-80Mn-20Cu-15Cr-55Ni-80Mo \quad (3)$$

wherein, in Formulae (1) to (3), the symbol of each element represents the content (mass %) of the element and is zero when the composition does not contain the element.

[2] A method for producing a line pipe having a tensile strength of 570 MPa or more, a compressive strength of 440 MPa or more, and a thickness of 30 mm or more, the method including cold forming a steel material for line pipes produced by the method described in [1] into a steel pipe-like shape; joining butting edges to each other by seam welding; and subsequently performing pipe expansion at an expansion ratio of 1.2% or less to produce a steel pipe.

[3] A steel material for line pipes, the steel material having a tensile strength of 570 MPa or more, a compressive strength of 440 MPa or more, and a thickness of 30 mm or more, the steel material including a composition containing, by mass, C: 0.030% to 0.10%,
Si: 0.01% to 0.20%,
Mn: 1.0% to 2.0%,
Nb: 0.005% to 0.050%,
Ti: 0.005% to 0.025%, and
Al: 0.08% or less, the composition further containing one or more elements selected from, by mass, Cu: 0.5% or less,
Ni: 1.0% or less,
Cr: 1.0% or less,
Mo: 0.5% or less, and
V: 0.1% or less, wherein a Ceq value represented by Formula (1) is 0.350 or more, a Pcm value represented by Formula (2) is 0.20 or less, and an $Ar_3$ transformation point represented by Formula (3) is 750° C. or less, with the balance being Fe and inevitable impurities, the steel material further including a metal microstructure composed primarily of bainite, wherein an area fraction of polygonal ferrite at a position of ¼ plate thickness is 10% or less, an area fraction of martensite-austenite constituent at the position of ¼ plate thickness is 5% or less, and an average grain size of bainite at a position of ½ plate thickness is 10 μm or less, $$Ceq=C+Mn/6+(Cu+Ni)/15+(Cr+Mo+V)/5 \quad (1)$$

$$Pcm=C+Si/30+(Mn+Cu+Cr)/20+Ni/60+Mo/15+V/10 \quad (2)$$

$$Ar_3(°\ C.)=910-310C-80Mn-20Cu-15Cr-55Ni-80Mo \quad (3)$$

wherein, in Formulae (1) to (3), the symbol of each element represents the content (mass %) of the element and is zero when the composition does not contain the element.

[4] A method for producing a line pipe having a tensile strength of 570 MPa or more, a compressive strength of 440 MPa or more, and a thickness of 30 mm or more, the method including cold forming a steel material for line pipes described in [3] into a steel pipe-like shape; joining butting edges to each other by seam welding; and subsequently performing pipe expansion at an expansion ratio of 1.2% or less to produce a steel pipe.

According to aspects of the present invention, a steel material for line pipes which has a high strength, excellent low-temperature toughness, and an excellent DWTT property may be produced. Aspects of the present invention may be suitably applied to offshore pipelines.

According to aspects of the present invention, a thick-walled line pipe having excellent low-temperature toughness and a high compressive strength may be provided without employing special conditions for forming steel pipes or performing a heat treatment subsequent to pipe making.

DETAILED DESCRIPTION OF EMBODIMENTS OF THE INVENTION

An embodiment of the present invention is described below. When referring to the contents of constituent elements, the symbol "%" refers to "% by mass" unless otherwise specified.

1. Chemical Composition

C: 0.030% to 0.10%

C is an element most effective in increasing the strength of a steel plate produced by accelerated cooling. However, if the C content is less than 0.030%, a sufficiently high strength may not be maintained. On the other hand, if the C content is more than 0.10%, toughness may become degraded. In addition, the formation of MA may be accelerated. This results in a reduction in compressive strength. Accordingly, the C content is limited to 0.030% to 0.10%. Preferable lower limit of C content is 0.040% and preferable upper limit is 0.098%.

Si: 0.01% to 0.20%

Si is contained for deoxidization. However, if the Si content is less than 0.01%, a sufficient deoxidation effect may not be achieved. On the other hand, if the Si content is more than 0.20%, toughness may become degraded. In addition, the formation of MA may be accelerated. This results in a reduction in compressive strength. Accordingly, the Si content is limited to 0.01% to 0.20%. Preferable lower limit of Si content is 0.03% and preferable upper limit is 0.15%.

Mn: 1.0% to 2.0%

Mn: 1.0% to 2.0%. Mn is contained for increasing strength and enhancing toughness. However, if the Mn content is less than 1.0%, the above advantageous effects may not be produced to a sufficient degree. On the other hand, if the Mn content is more than 2.0%, toughness may become degraded. Accordingly, the Mn content is limited to 1.0% to 2.0%. Preferable lower limit of Mn content is 1.5% and preferable upper limit is 1.95%.

Nb: 0.005% to 0.050%

Nb reduces the size of microstructures and thereby enhances toughness. Nb also causes the formation of carbides, which increase strength. However, if the Nb content is less than 0.005%, the above advantageous effects may not be produced to a sufficient degree. On the other hand, if the Nb content is more than 0.050%, the toughness of a weld heat-affected zone may become degraded. Accordingly, the Nb content is limited to 0.005% to 0.050%. Preferable lower limit of Nb content is 0.010% and preferable upper limit is 0.040%.

Ti: 0.005% to 0.025%

Ti suppresses coarsening of austenite grains during heating of slabs by the pinning effect of TiN and thereby enhances toughness. However, if the Ti content is less than 0.005%, the above advantageous effects may not be produced to a sufficient degree. On the other hand, if the Ti content is more than 0.025%, toughness may become degraded. Accordingly, the Ti content is limited to 0.005% to 0.025%. Preferable lower limit of Ti content is 0.008% and preferable upper limit is 0.023%.

Al: 0.08% or Less

Al is contained as a deoxidizing agent. However, if the Al content is more than 0.08%, the cleanliness of steel may become degraded and toughness may become degraded. Accordingly, the Al content is limited to 0.08% or less. The Al content is preferably 0.05% or less.

In accordance with aspects of the present invention, one or more elements selected from Cu: 0.5% or less, Ni: 1.0% or less, Cr: 1.0% or less, Mo: 0.5% or less, and V: 0.1% or less are contained.

Cu: 0.5% or Less

Cu is an element effective in improving toughness and increasing strength. However, if the Cu content is more than 0.5%, the HAZ toughness of a weld zone may become degraded. Accordingly, in the case where Cu is contained, the Cu content is limited to 0.5% or less. The lower limit for the Cu content is not specified. In the case where Cu is contained, the Cu content is preferably 0.01% or more.

Ni: 1.0% or Less

Ni is an element effective in improving toughness and increasing strength. However, if the Ni content is more than 1.0%, the HAZ toughness of a weld zone may become degraded. Accordingly, in the case where Ni is contained, the Ni content is limited to 1.0% or less. The lower limit for the Ni content is not specified. In the case where Ni is contained, the Ni content is preferably 0.01% or more.

Cr: 1.0% or Less

Cr is an element that enhances hardenability and thereby effectively increase strength. However, if the Cr content is more than 1.0%, the HAZ toughness of a weld zone may become degraded. Accordingly, in the case where Cr is contained, the Cr content is limited to 1.0% or less. The lower limit for the Cr content is not specified. In the case where Cr is contained, the Cr content is preferably 0.01% or more.

Mo: 0.5% or Less

Mo is an element effective in improving toughness and increasing strength. However, if the Mo content is more than 0.5%, the HAZ toughness of a weld zone may become degraded. Accordingly, in the case where Mo is contained, the Mo content is limited to 0.5% or less. The lower limit for the Mo content is not specified. In the case where Mo is contained, the Mo content is preferably 0.01% or more.

V: 0.1% or Less

V is an element that forms complex carbides as well as Nb and Ti and is markedly effective in increasing strength by precipitation strengthening. However, if the V content is more than 0.1%, the HAZ toughness of a weld zone may become degraded. Accordingly, in the case where V is contained, the V content is limited to 0.1% or less. The lower limit for the V content is not specified. In the case where V is contained, the V content is preferably 0.01% or more.

In accordance with aspects of the present invention, the Ceq value represented by Formula (1) is 0.350 or more, the Pcm value represented by Formula (2) is 0.20 or less, and the $Ar_3$ transformation point represented by Formula (3) is 750° C. or less.

Ceq Value: 0.350 or More

The Ceq value is limited to 0.350 or more. The Ceq value is represented by Formula (1) below. The Ceq value has a correlation with the strength of base metal and is used as a measure of strength. If the Ceq value is less than 0.350, a high tensile strength of 570 MPa or more may not be achieved. Accordingly, the Ceq value is limited to 0.350 or more. The Ceq value is preferably 0.360 or more.

$$Ceq=C+Mn/6+(Cu+Ni)/15+(Cr+Mo+V)/5 \quad (1)$$

In Formula (1), the symbol of each element represents the content (mass %) of the element and is zero when the composition does not contain the element.

Pcm Value: 0.20 or Less

The Pcm value is limited to 0.20 or less. The Pcm value is represented by Formula (2) below. The Pcm value is used as a measure of weldability; the higher the Pcm value, the lower the toughness of a welded HAZ. The Pcm value needs to be strictly limited particularly in a thick-walled high-strength steel, because the impact of the Pcm value is significant in the thick-walled high-strength steel. Accordingly, the Pcm value is limited to 0.20 or less. The Pcm value is preferably 0.19 or less.

$$Pcm=C+Si/30+(Mn+Cu+Cr)/20+Ni/60+Mo/15+V/10 \quad (2)$$

In Formula (2), the symbol of each element represents the content (mass %) of the element and is zero when the composition does not contain the element.

$Ar_3$ Transformation Point: 750° C. or Less

The $Ar_3$ transformation point is limited to 750° C. or less. Formula (3) below represents the $Ar_3$ transformation point. The higher the $Ar_3$ transformation point, the higher the temperature at which ferrite is formed and the more the difficulty in achieving the metal microstructure according to aspects of the present invention. In addition, it becomes more difficult to achieve both intended compressive strength and intended toughness. Accordingly, the composition is controlled such that the $Ar_3$ transformation point is 750° C. or less.

$$Ar_3(° C.)=910-310C-80Mn-20Cu-15Cr-55Ni-80Mo \quad (3)$$

In Formula (3), the symbol of each element represents the content (mass %) of the element and is zero when the composition does not contain the element.

The remaining part of the composition which is other than the above-described constituents, that is, the balance, includes Fe and inevitable impurities. The composition may contain an element other than the above-described elements such that the action and advantageous effects according to aspects of the present invention are not impaired.

2. Metal Microstructure

Composed Primarily of Bainite

The metal microstructure according to aspects of the present invention is composed primarily of bainite in order to limit the reduction in compressive strength due to the Bauschinger effect. The expression "the metal microstructure according to aspects of the present invention is composed primarily of bainite" means that the area fraction of bainite in the entire metal microstructure is 85% or more. For limiting the reduction in compressive strength due to the Bauschinger effect, the metal microstructure is desirably composed only of bainite in order to prevent the dislocation accumulation at the interfaces between different phases and the hard second phase. When the fraction of the balance microstructures other than bainite is 15% or less, they may be acceptable. Note that, the area fraction of bainite is measured at a position of ¼ plate thickness.

Area Fractions of Polygonal Ferrite and Martensite-Austenite Constituent at Position of ¼ Plate Thickness Are 10% or Less and 5% or Less, Respectively For reducing the Bauschinger effect and achieving a high compressive strength, it is desirable to form a uniform microstructure free of a soft polygonal ferrite phase or a hard martensite-austenite constituent in order to reduce the likelihood of dislocations being locally integrated inside the microstructure during deformation. Accordingly, in addition to forming a microstructure composed primarily of bainite as described above, the area fractions of polygonal ferrite and the martensite-austenite constituent at a position of ¼ plate thickness are limited to 10% or less and 5% or less, respectively. The area fractions of polygonal ferrite and the martensite-austenite constituent may be 0%.

Average Grain Size of Bainite at Position of ½ Plate Thickness Is 10 μm or Less

It is effective to form a fine microstructure for producing a thick-walled steel plate having sufficiently high base metal toughness particularly at a position of ½ plate thickness. The above advantageous effects may be produced by adjusting the grain size of bainite at a position of ½ plate thickness to 10 μm or less. Accordingly, the average grain size of bainite at a position of ½ plate thickness is limited to 10 μm or less.

The metal microstructure according to aspects of the present invention may include any phases other than bainite, polygonal ferrite, or the martensite-austenite constituent as long as it includes the above-described structure. Examples of the other phases include pearlite, cementite, and martensite. The amount of the other phases is preferably minimized; the area fraction of the other phases at a position of ¼ plate thickness is preferably 5% or less.

3. Method for Producing Steel Material for Line Pipes

The method for producing a steel material for line pipes according to aspects of the present invention includes heating a steel slab having the above-described chemical composition, hot rolling the steel slab, and subsequently performing accelerated cooling. The reasons for limiting the production conditions are described below. Hereinafter, the term "temperature" refers to the average temperature of the steel plate (steel material) in the thickness direction, unless otherwise specified. The average temperature of the steel plate (steel material) in the thickness direction is determined on the basis of thickness, surface temperature, cooling conditions, etc. by simulation calculation or the like. For example, the average temperature of the steel plate (steel material) in the thickness direction may be calculated from a temperature distribution in the thickness direction determined by a finite difference method.

Steel Slab Heating Temperature: 1000° C. to 1200° C.

If the steel slab heating temperature is less than 1000° C., NbC does not dissolve sufficiently and, consequently, precipitation strengthening may not be achieved in the subsequent step. On the other hand, if the steel slab heating temperature is more than 1200° C., low-temperature toughness may become degraded. Accordingly, the steel slab heating temperature is limited to 1000° C. to 1200° C. Preferable lower limit of the steel slab heating temperature is 1000° C. and preferable upper limit is 1150° C.

Cumulative Rolling Reduction Ratio in Non-Recrystallization Temperature Range: 60% or More, and Cumulative Rolling Reduction Ratio in Temperature Range of (Rolling Finish Temperature +20° C.) or Less: 50% or More For achieving high base metal toughness, it is necessary to perform sufficient rolling reduction within the non-recrystallization temperature range in the hot rolling process. However, if the cumulative rolling reduction ratio in the non-recrystallization temperature range is less than 60% or the cumulative rolling reduction in the temperature range of (rolling finish temperature +20° C.) or less is less than 50%, the size of crystal grains may not be reduced to a sufficient degree. Accordingly, the cumulative rolling reduction ratio in the non-recrystallization temperature range is limited to 60% or more, and the cumulative rolling reduction in the temperature range of (rolling finish temperature +20° C.) or less is limited to 50% or more. The cumulative rolling reduction ratio in the non-recrystallization temperature range is preferably 65% or more. The cumulative rolling reduction ratio in the temperature range of (rolling finish temperature +20° C.) or less is preferably 55% or more.

Rolling Finish Temperature: $Ar_3$ Transformation Point or More and 790° C. or Less For limiting the reduction in strength due to the Bauschinger effect, it is necessary to form a metal microstructure composed primarily of bainite and suppress the formation of soft microstructures, such as polygonal ferrite. This requires the hot rolling to be performed within the temperature range of the $Ar_3$ transformation point or more, in which polygonal ferrite does not form. Accordingly, the rolling finish temperature is limited to the $Ar_3$ transformation point or more. For achieving high base metal toughness, it is necessary to perform the rolling at lower temperatures in the temperature range of the $Ar_3$ transformation point or more. Accordingly, the upper limit for the rolling finish temperature is set to 790° C. The rolling finish temperature is preferably 780° C. or less.

Cooling Start Temperature: $Ar_3$ Transformation Point or More

If the cooling start temperature is less than the $Ar_3$ transformation point, the area fraction of polygonal ferrite at a position of ¼ plate thickness may exceed 10% and a sufficiently high compressive strength may not be achieved due to the Bauschinger effect. Accordingly, the cooling start temperature is limited to the $Ar_3$ transformation point or more. The cooling start temperature is preferably (the $Ar_3$ transformation point +10° C.) or more.

As described above, the $Ar_3$ transformation point can be calculated using Formula (3).

$$Ar_3(°C.)=910-310C-80Mn-20Cu-15Cr-55Ni-80Mo \quad (3)$$

In Formula (3), the symbol of each element represents the content (mass %) of the element and is zero when the composition does not contain the element.

Cooling Rate: 10° C./s or More

Accelerated cooling performed at a cooling rate of 10° C./s or more is a process essential for producing a high strength steel plate having high toughness. Performing cooling at a high cooling rate enables strength to be increased due to transformation strengthening. However, if the cooling rate is less than 10° C./s, a sufficiently high strength may not be achieved. Furthermore, diffusion of C may occur during cooling. This results in concentrating of C at non-transformed austenite and an increase in the amount of MA formed. Consequently, compressive strength may be reduced, because the presence of hard second phases, such as MA, accelerates the Bauschinger effect as described above. When the cooling rate is 10° C./s or more, diffusion of C which occurs during the cooling may be suppressed and, consequently, the formation of MA may be reduced. Accordingly, the cooling rate in the accelerated cooling is limited to 10° C./s or more. The cooling rate is preferably 20° C./s or more.

Cooling Stop Temperature: Temperature of Surface of Steel Plate Is 300° C. to 500° C.

Performing rapid cooling until the temperature of the surface of the steel plate reaches 300° C. to 500° C. by the accelerated cooling subsequent to the rolling suppresses the formation of MA and pearlite and enables the formation of a uniform microstructure composed primarily of bainite. However, if the cooling stop temperature is less than 300° C., MA may be formed. This results in a reduction in compressive strength due to the Bauschinger effect and degradation of toughness. When the cooling stop temperature at the surface of the steel plate is set to 300° C. or more, MA becomes decomposed due to recuperation and, consequently, a uniform microstructure may be formed. On the other hand, if the cooling stop temperature is more than 500° C., pearlite may be formed. This makes it not possible to achieve a sufficiently high strength and results in a reduction in compressive strength due to the Bauschinger effect. Accordingly, the cooling stop temperature is determined such that the temperature of the surface of the steel plate is 300° C. to 500° C. Preferable lower limit of the cooling stop temperature is 350° C. and preferable upper limit is 490° C.

4. Method for Producing Line Pipe

In accordance with aspects of the present invention, a steel pipe (line pipe) is produced using a steel plate (steel material) produced by the above-described method. Examples of a method for forming the steel material include a method in which a steel material is formed into the shape of a steel pipe by cold forming, such as a UOE process or press bending (also referred to as "bending press"). In the UOE process, the edges of a steel plate (steel material) in the width direction are subjected to edge preparation and then the edges of the steel plate in the width direction is crimped using a C-press machine. Subsequently, the steel plate is formed into a cylindrical shape such that the edges of the steel plate in the width direction face each other using a U-ing press machine and an O-ing press machine. Then, the edges of the steel plate in the width direction are brought into abutment with and welded to each other. This welding is referred to as "seam welding". The seam welding is preferably performed using a method including two steps, that is, a tack welding step of holding the cylindrical steel plate, bringing the edges of the steel plate in the width direction into abutment with each other, and performing tack welding; and a final welding step of subjecting the inner and outer surfaces of the seam of the steel plate to welding using a submerged arc welding method. After the seam welding, pipe expansion is performed in order to remove welding residual stress and to improve the roundness of the steel pipe. In the pipe expansion step, the expansion ratio (the ratio of a change in the outer diameter of the pipe which occurs during the pipe expansion to the outer diameter of the pipe before the pipe expansion) is set to 1.2% or less. This is because, if the expansion ratio is excessively high, compressive strength may be significantly reduced due to the Bauschinger effect. The expansion ratio is preferably 1.0% or less. The expansion ratio is preferably 0.4% or more and is more preferably 0.6% or more in order to reduce welding residual stress and enhance the roundness of the steel pipe.

In the press bending, the steel plate is repeatedly subjected to three-point bending to gradually change its shape and, thereby, a steel pipe having a substantially circular cross section is produced. Then, seam welding is performed as in the UOE process described above. Also in the press bending, pipe expansion may be performed after the seam welding.

EXAMPLES

Slabs were manufactured from steels (Steel types A to K) having the chemical compositions described in Table 1 by a continuous casting process. Steel plates (Nos. 1 to 25) having a thickness of 35 to 40 mm were manufactured from the slabs. Steel pipes were manufactured from the steel plates by the UOE process. Seam welding was performed by four-wire submerged arc welding such that one welding path is formed on both of the inner and outer surfaces of the seam. The heat input during the welding was selected from the range of 20 to 80 kJ/cm in accordance with the thickness of the steel plate. Table 2 summarizes the conditions under which the steel plates were produced and the condition under which the steel pipes were produced (expansion ratio).

TABLE 1

| Steel type | Composition (mass %) | | | | | | | | | | | Ceq value[1] | Pcm value[2] | Ar$_3$ transformation point[3] | Remark |
|---|---|---|---|---|---|---|---|---|---|---|---|---|---|---|---|
| | C | Si | Mn | Nb | Ti | Al | Cu | Ni | Cr | Mo | V | | | | |
| A | 0.050 | 0.050 | 1.85 | 0.028 | 0.010 | 0.030 | 0.100 | 0.100 | 0.300 | 0.100 | 0.020 | 0.456 | 0.175 | 727 | Invention |
| B | 0.043 | 0.140 | 1.70 | 0.020 | 0.015 | 0.033 | | 0.200 | 0.120 | | | 0.364 | 0.142 | 748 | example |
| C | 0.095 | 0.060 | 1.54 | 0.025 | 0.010 | 0.020 | | | 0.020 | 0.210 | | 0.398 | 0.189 | 740 | |
| D | 0.065 | 0.070 | 1.60 | 0.030 | 0.011 | 0.025 | 0.150 | 0.150 | 0.200 | | 0.030 | 0.398 | 0.170 | 748 | |
| E | 0.060 | 0.040 | 1.90 | 0.025 | 0.020 | 0.033 | 0.020 | 0.020 | | 0.050 | | 0.389 | 0.161 | 734 | |
| F | 0.050 | 0.050 | 1.78 | 0.018 | 0.012 | 0.030 | 0.300 | 0.320 | | 0.100 | | 0.408 | 0.168 | 721 | |
| G | <u>0.028</u> | 0.060 | 1.90 | 0.028 | 0.020 | 0.025 | | | | | 0.005 | <u>0.346</u> | 0.126 | 749 | Comparative |
| H | 0.080 | 0.050 | <u>2.10</u> | 0.030 | 0.013 | 0.033 | 0.200 | 0.250 | 0.200 | 0.100 | | 0.520 | <u>0.218</u> | 688 | example |
| I | 0.055 | 0.100 | 1.55 | | 0.012 | 0.032 | 0.200 | | 0.150 | | | 0.357 | 0.153 | <u>763</u> | |
| J | <u>0.140</u> | 0.150 | 1.55 | 0.025 | 0.011 | 0.028 | 0.200 | 0.200 | | | | 0.425 | <u>0.236</u> | 728 | |
| K | 0.065 | <u>0.250</u> | 1.80 | 0.030 | 0.015 | 0.025 | 0.200 | 0.200 | | 0.100 | 0.010 | 0.414 | 0.184 | 723 | |

*The underlined values are outside the scope of the present invention.
Formula (1): Ceq = C + Mn/6 + (Cu + Ni)/15 + (Cr + Mo + V)/5
Formula (2): Pcm = C + Si/30 + Mn/20 + Cu/20 + Ni/60 + Cr/20 + Mo/15 + V/10
Formula (3): Ar$_3$ = 910 − 310C − 80Mn − 20Cu − 15Cr − 55Ni − 80Mo To determine the tensile properties of the steel pipes produced as described above, a full-thickness test piece in the circumferential direction of the pipe was taken from each of the steel pipes as a test piece for tensile test and the tensile strength of the test piece was measured by a tensile test. In a compression test, a test piece having a diameter of 20 mm and a length of 60 mm was taken from the inner surface-side portion of each of the steel pipes in the circumferential direction of the pipe and the 0.5% compressive proof strength of the test piece was measured as a compressive yield strength.

TABLE 2

| No. | Steel type | Ar₃ transformation point (° C.) | Thickness (mm) | Heating temperature (° C.) | Cumulative rolling reduction ratio Non-recrystallization temperature range (%) | Cumulative rolling reduction ratio Below (rolling finish temperature + 20° C.) (%) | Rolling finish temperature (° C.) | Cooling start temperature (° C.) | Cooling rate (° C./s) | Cooling stop temperature (° C.) | Expansion ratio (%) | Remark |
|---|---|---|---|---|---|---|---|---|---|---|---|---|
| 1 | A | 727 | 40 | 1050 | 75 | 70 | 760 | 755 | 25 | 430 | 0.8 | Invention |
| 2 | A | 727 | 40 | 1030 | 75 | 55 | 765 | 750 | 20 | 440 | 0.8 | example |
| 3 | A | 727 | 40 | 1040 | 75 | 75 | 780 | 770 | 20 | 430 | 0.8 | |
| 4 | A | 727 | 40 | 1060 | 75 | 70 | 765 | 755 | 27 | 350 | 0.8 | |
| 5 | A | 727 | 40 | 1050 | 75 | 70 | 760 | 750 | 22 | 490 | 0.8 | |
| 6 | B | 748 | 35 | 1100 | 80 | 75 | 775 | 770 | 30 | 400 | 0.8 | |
| 7 | C | 740 | 35 | 1060 | 75 | 75 | 775 | 765 | 35 | 390 | 1.0 | |
| 8 | D | 748 | 35 | 1100 | 75 | 70 | 770 | 760 | 30 | 460 | 1.0 | |
| 9 | E | 734 | 35 | 1050 | 75 | 70 | 775 | 765 | 28 | 400 | 1.0 | |
| 10 | F | 721 | 40 | 1050 | 75 | 70 | 755 | 745 | 32 | 400 | 0.6 | |
| 11 | A | 727 | 40 | 950 | 75 | 70 | 770 | 760 | 20 | 450 | 0.8 | Comparative |
| 12 | A | 727 | 40 | 1250 | 75 | 70 | 765 | 760 | 25 | 420 | 0.8 | example |
| 13 | A | 727 | 40 | 1050 | 55 | 55 | 760 | 750 | 25 | 410 | 0.8 | |
| 14 | A | 727 | 40 | 1040 | 75 | 45 | 765 | 760 | 25 | 440 | 0.8 | |
| 15 | A | 727 | 40 | 1030 | 75 | 70 | 725 | 720 | 20 | 380 | 0.8 | |
| 16 | A | 727 | 40 | 1050 | 75 | 70 | 800 | 790 | 30 | 460 | 0.8 | |
| 17 | F | 721 | 40 | 1060 | 75 | 75 | 760 | 750 | 5 | 450 | 0.8 | |
| 18 | F | 721 | 40 | 1030 | 75 | 70 | 770 | 760 | 30 | 250 | 0.8 | |
| 19 | F | 721 | 40 | 1070 | 75 | 75 | 760 | 750 | 20 | 550 | 0.8 | |
| 20 | F | 721 | 40 | 1040 | 75 | 75 | 760 | 750 | 26 | 370 | 1.6 | |
| 21 | G | 749 | 35 | 1060 | 75 | 70 | 775 | 770 | 25 | 430 | 0.8 | |
| 22 | H | 688 | 40 | 1030 | 75 | 70 | 760 | 750 | 20 | 450 | 1.0 | |
| 23 | I | 763 | 35 | 1050 | 80 | 75 | 775 | 760 | 20 | 400 | 0.8 | |
| 24 | J | 728 | 40 | 1080 | 75 | 75 | 765 | 755 | 25 | 390 | 1.0 | |
| 25 | K | 723 | 35 | 1030 | 75 | 70 | 770 | 760 | 25 | 410 | 1.0 | |

*The underlined values are outside the scope of the present invention.

A DWTT test piece was taken from each of the steel pipes in the circumferential direction of the pipe. Using the DWTT test piece, the temperature at which the percent ductile fracture reached 85% was determined as 85% SATT.

For determining the HAZ toughness of the joint, the temperature at which the percent ductile fracture reached 50% was determined as vTrs. The position of the notch was determined such that the fusion line was located at the center of the notch root of the Charpy test piece and the ratio between the weld metal and the base metal (including welded heat-affected zone) at the notch root was 1:1.

For determining metal microstructure, a sample was taken from the inner surface-side portion of each of the steel pipes at a position of ¼ plate thickness. The sample was etched using nital after polishing, and the metal microstructure was observed using an optical microscope. The area fractions of bainite and polygonal ferrite were calculated by image analysis of 3 photographs captured at a 200-fold magnification. For observing MA, the sample used for measuring the area fractions of bainite and polygonal ferrite was subjected to nital etching and then electrolytic etching (two-step etching). Subsequently, the metal microstructure was observed with a scanning electron microscope (SEM). The area fraction of MA was calculated by image analysis of 3 photographs captured at a 1000-fold magnification. The average grain size of bainite was determined by a linear analysis using a micrograph obtained by taking a sample from the inner surface-side portion of each of the steel pipes at a position of ¼ plate thickness, etching the sample using nital after polishing, and observing the metal microstructure using an optical microscope.

Although the metal microstructures of the steel pipes are determined in Examples, the results may be considered as the metal microstructures of the respective steel plates (steel materials).

Table 3 shows the metal microstructures and mechanical properties measured.

TABLE 3

| No. | Steel type | Metal microstructure Plate thickness ¼ position Area fraction of bainite (%) | Area fraction of polygonal ferrite (%) | Area fraction of martensite-austenite constituent (%) | Balance | Plate thickness ½ position Bainite grain size (μm) | Mechanical properties Tensile strength (MPa) | Compressive strength (MPa) | DWTT property 85% SATT (° C.) | HAZ toughness vTrs (° C.) | Remark |
|---|---|---|---|---|---|---|---|---|---|---|---|
| 1 | A | 93.8 | 3.5 | 2.4 | θ | 7.0 | 654 | 515 | −25 | −37 | Invention |
| 2 | A | 93.0 | 4.2 | 2.3 | θ | 9.0 | 637 | 491 | −20 | −37 | example |
| 3 | A | 98.1 | 0.0 | 1.5 | θ | 9.5 | 660 | 523 | −18 | −37 | |
| 4 | A | 95.4 | 1.8 | 2.8 | — | 6.0 | 678 | 453 | −30 | −38 | |
| 5 | A | 92.1 | 3.8 | 2.2 | θ, P | 7.5 | 637 | 440 | −27 | −37 | |
| 6 | B | 91.3 | 5.1 | 3.2 | θ | 8.0 | 610 | 450 | −25 | −50 | |
| 7 | C | 91.1 | 4.8 | 4.1 | — | 6.5 | 626 | 452 | −35 | −25 | |

TABLE 3-continued

| | | Metal microstructure | | | | Mechanical properties | | | | |
|---|---|---|---|---|---|---|---|---|---|---|
| | | Plate thickness ¼ position | | | | Plate thickness ½ position | | | | |
| No. | Steel type | Area fraction of bainite (%) | Area fraction of polygonal ferrite (%) | Area fraction of martensite-austenite constituent (%) | Balance | ½ position Bainite grain size (μm) | Tensile strength (MPa) | Compressive strength (MPa) | DWTT property 85% SATT (° C.) | HAZ toughness vTrs (° C.) | Remark |
| 8 | D | 88.0 | 7.5 | 2.8 | θ | 7.5 | 628 | 461 | −30 | −27 | |
| 9 | E | 96.9 | 0.0 | 2.5 | θ | 7.0 | 608 | 451 | −20 | −40 | |
| 10 | F | 95.2 | 2.2 | 2.3 | θ | 7.5 | 597 | 471 | −25 | −35 | |
| 11 | A | 97.1 | 0.0 | 2.2 | θ | 6.5 | <u>559</u> | 454 | −30 | −38 | Comparative example |
| 12 | A | 97.6 | 0.0 | 1.9 | θ | <u>20.0</u> | 772 | 594 | 0 | −38 | |
| 13 | A | 95.0 | 2.3 | 2.4 | θ | <u>18.0</u> | 655 | 494 | −5 | −37 | |
| 14 | A | 96.9 | 0.0 | 2.6 | θ | <u>18.5</u> | 650 | 503 | 0 | −36 | |
| 15 | A | <u>75.8</u> | <u>20.0</u> | 4.2 | — | 6.0 | <u>543</u> | <u>423</u> | −32 | −37 | |
| 16 | A | 96.8 | 0.0 | 2.4 | θ | <u>21.0</u> | 673 | 508 | 0 | −37 | |
| 17 | F | 88.2 | 1.2 | <u>6.1</u> | θ, P | 9.0 | 586 | <u>394</u> | −15 | −40 | |
| 18 | F | 92.4 | 0.0 | <u>7.6</u> | — | 7.0 | 634 | <u>322</u> | −7 | −41 | |
| 19 | F | <u>76.5</u> | 6.5 | 2.7 | θ, P | 9.1 | <u>567</u> | <u>339</u> | −17 | −41 | |
| 20 | F | 96.1 | 1.5 | 2.4 | — | 6.8 | 604 | <u>338</u> | −25 | −41 | |
| 21 | <u>G</u> | 94.3 | 4.1 | 1.0 | θ | 8.2 | <u>560</u> | 443 | −20 | −55 | |
| 22 | <u>H</u> | 93.1 | 0.0 | 4.8 | θ, P | 6.2 | 709 | 523 | −32 | −5 | |
| 23 | <u>I</u> | 85.6 | <u>12.0</u> | 2.1 | θ | 9.5 | 574 | <u>420</u> | −12 | −42 | |
| 24 | <u>J</u> | 87.0 | 3.2 | <u>7.2</u> | θ, P | 6.7 | 645 | <u>438</u> | −23 | 0 | |
| 25 | <u>K</u> | 93.2 | 0.0 | <u>6.8</u> | — | 7.2 | 619 | <u>420</u> | −22 | −28 | |

*The underlined values are outside the scope of the present invention.
*In the above table, "θ" and "P" denote cementite and pearlite, respectively.

In Table 3, all of Nos. 1 to 10 had a tensile strength of 570 MPa or more; a compressive strength of 440 MPa or more; as for DWTT property, a 85% SATT of −10° C. or less; and a HAZ toughness of −20° C. or less. That is, all of Nos. 1 to 10 were evaluated as good.

In contrast, in Nos. 11 to 20, although the composition fell within the scope of the present invention, the production method was outside the scope of the present invention and therefore the intended microstructure was not formed. As a result, Nos. 11 to 20 were evaluated as poor in terms of any of tensile strength, compressive strength, and DWTT property. In Nos. 21 to 25, the chemical composition was outside the scope of the present invention. As a result, Nos. 21 to 25 were evaluated as poor in terms of any of tensile strength, compressive strength, DWTT property, and HAZ toughness.

According to aspects of the present invention, a high-strength steel pipe of API-X70 grade or more which has excellent low-temperature toughness and an excellent DWTT property may be produced. Therefore, the steel pipe according to aspects of the present invention may be used as deep-sea line pipes that require high collapse resistant performance.

The invention claimed is:

1. A method for producing a steel material for line pipes, the steel material having a tensile strength of 570 MPa or more, a compressive strength of 440 MPa or more, and a thickness of 30 mm or more, the method comprising heating a steel having a composition containing, by mass,
   C: 0.030% to 0.10%,
   Si: 0.01% to 0.20%,
   Mn: 1.0% to 2.0%,
   Nb: 0.005% to 0.050%,
   Ti: 0.005% to 0.025%, and
   Al: 0.08% or less,
   the composition further containing one or more elements selected from, by mass,
   Cu: 0.5% or less,
   Ni: 1.0% or less,
   Cr: 1.0% or less,
   Mo: 0.5% or less, and
   V: 0.1% or less,
   wherein a Ceq value represented by Formula (1) is 0.350 or more, a Pcm value represented by Formula (2) is 0.20 or less, and an $Ar_3$ transformation point represented by Formula (3) is 750° C. or less, with the balance being Fe and inevitable impurities, to a temperature of 1000° C. to 1200° C.; performing hot rolling such that a cumulative rolling reduction ratio in a non-recrystallization temperature range is 60% or more, such that a cumulative rolling reduction ratio in a temperature range of (a rolling finish temperature+ 20° C.) or less is 50% or more, and such that a rolling finish temperature is the $Ar_3$ transformation point or more and 790° C. or less; and subsequently performing accelerated cooling from a cooling start temperature of the $Ar_3$ transformation point or more, at a cooling rate of 10° C./s or more, until the temperature of a surface of a steel plate reaches 300° C. to 500° C., such that a metal microstructure is formed in the steel material that is composed primarily of bainite, wherein an area fraction of polygonal ferrite at a position of ¼ plate thickness is 10% or less, an area fraction of martensite-austenite constituent at the position of ¼ plate thickness is 5% or less, and an average grain size of bainite at a position of ½ plate thickness is 10 μm or less, $$Ceq = C + Mn/6 + (Cu+Ni)/15 + (Cr+Mo+V)/5 \quad (1)$$

$$Pcm = C + Si/30 + (Mn+Cu+Cr)/20 + Ni/60 + Mo/15 + V/10 \quad (2)$$

$$Ar_3(°C.) = 910 - 310C - 80Mn - 20Cu - 15Cr - 55Ni - 80Mo \quad (3)$$

wherein, in Formulae (1) to (3), the symbol of each element represents the content (mass %) of the element and is zero when the composition does not contain the element.

2. A method for producing a line pipe having a tensile strength of 570 MPa or more, a compressive strength of 440 MPa or more, and a thickness of 30 mm or more, the method comprising cold forming a steel material for line pipes produced by the method according to claim 1 into a steel pipe shape by butting opposed edges of the steel material to one another; joining the butting edges to each other by seam welding; and subsequently performing pipe expansion at an expansion ratio of 1.2% or less to produce a steel pipe.

3. A steel material for line pipes, the steel material having a tensile strength of 570 MPa or more, a compressive strength of 440 MPa or more, and a thickness of 30 mm or more, the steel material comprising a composition containing, by mass, C: 0.030% to 0.10%,
Si: 0.01% to 0.20%,
Mn: 1.0% to 2.0%,
Nb: 0.005% to 0.050%,
Ti: 0.005% to 0.025%, and
Al: 0.08% or less,
the composition further containing one or more elements selected from, by mass,
Cu: 0.5% or less,
Ni: 1.0% or less,
Cr: 1.0% or less,
Mo: 0.5% or less, and
V: 0.1% or less,
wherein a Ceq value represented by Formula (1) is 0.350 or more, a Pcm value represented by Formula (2) is 0.20 or less, and an $Ar_3$ transformation point represented by Formula (3) is 750° C. or less, with the balance being Fe and inevitable impurities, the steel material further comprising a metal microstructure composed primarily of bainite, wherein an area fraction of polygonal ferrite at a position of ¼ plate thickness is 10% or less, an area fraction of martensite-austenite constituent at the position of ¼ plate thickness is 5% or less, and an average grain size of bainite at a position of ½ plate thickness is 10 µm or less, $$Ceq = C + Mn/6 + (Cu+Ni)/15 + (Cr+Mo+V)/5 \quad (1)$$

$$Pcm = C + Si/30 + (Mn+Cu+Cr)/20 + Ni/60 + Mo/15 + V/10 \quad (2)$$

$$Ar_3(° C.) = 910 - 310C - 80Mn - 20Cu - 15Cr - 55Ni - 80Mo \quad (3)$$

wherein, in Formulae (1) to (3), the symbol of each element represents the content (mass %) of the element and is zero when the composition does not contain the element.

4. A method for producing a line pipe having a tensile strength of 570 MPa or more, a compressive strength of 440 MPa or more, and a thickness of 30 mm or more, the method comprising cold forming a steel material for line pipes according to claim 3 into a steel pipe shape by butting opposed edges of the steel material to one another; joining the butting edges to each other by seam welding; and subsequently performing pipe expansion at an expansion ratio of 1.2% or less to produce a steel pipe.

* * * * *